US010343619B2

(12) United States Patent
Buss

(10) Patent No.: US 10,343,619 B2
(45) Date of Patent: Jul. 9, 2019

(54) CAMERA DEVICE

(71) Applicant: Huf Hülsbeck & Fürst GmbH & Co. KG, Velbert (DE)

(72) Inventor: Wolfgang Buss, Solingen (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 46 days.

(21) Appl. No.: 15/117,946

(22) PCT Filed: Feb. 11, 2015

(86) PCT No.: PCT/EP2015/052894
§ 371 (c)(1),
(2) Date: Aug. 10, 2016

(87) PCT Pub. No.: WO2015/121315
PCT Pub. Date: Aug. 20, 2015

(65) Prior Publication Data
US 2016/0347258 A1 Dec. 1, 2016

(30) Foreign Application Priority Data
Feb. 11, 2014 (DE) .................. 10 2014 101 685

(51) Int. Cl.
*H04N 5/225* (2006.01)
*B60R 11/04* (2006.01)
*F16M 11/18* (2006.01)
*B60R 11/00* (2006.01)

(52) U.S. Cl.
CPC ............ *B60R 11/04* (2013.01); *F16M 11/18* (2013.01); *H04N 5/2252* (2013.01); *B60R 2011/0094* (2013.01)

(58) Field of Classification Search
CPC ............ B60R 11/04; B60R 2011/0094; H04N 5/2252; F16M 11/18
See application file for complete search history.

(56) References Cited

U.S. PATENT DOCUMENTS 8,137,007 B1 * 3/2012 Harvey .................. B64D 47/08
396/12
2003/0090579 A1 * 5/2003 Ohe ........................ G02B 7/10
348/240.3
(Continued)

FOREIGN PATENT DOCUMENTS

DE 102006039192 A1 2/2008
DE 102006048371 A1 4/2008
(Continued)

*Primary Examiner* — Mekonnen D Dagnew
(74) *Attorney, Agent, or Firm* — Rudy J. Ng; Bret E. Field; Bozicevic, Field & Francis LLP

(57) ABSTRACT

The invention relates to a camera device (10), particularly as a parking assistance apparatus for a motor vehicle with a drive (50) which is in an operative connection via gear means with a camera (4) which is moveable between a retracted position (1) and a deployed position (2), a carriage (11) which embraces the camera (4) and is moveable together with the camera (4), wherein the gear means are configured in such a way that via a manual actuation from the outside (5) the camera (4) is moveable in a further additional position (3) going beyond the retracted position (1).

32 Claims, 9 Drawing Sheets

(56) References Cited

U.S. PATENT DOCUMENTS

Figure 1:
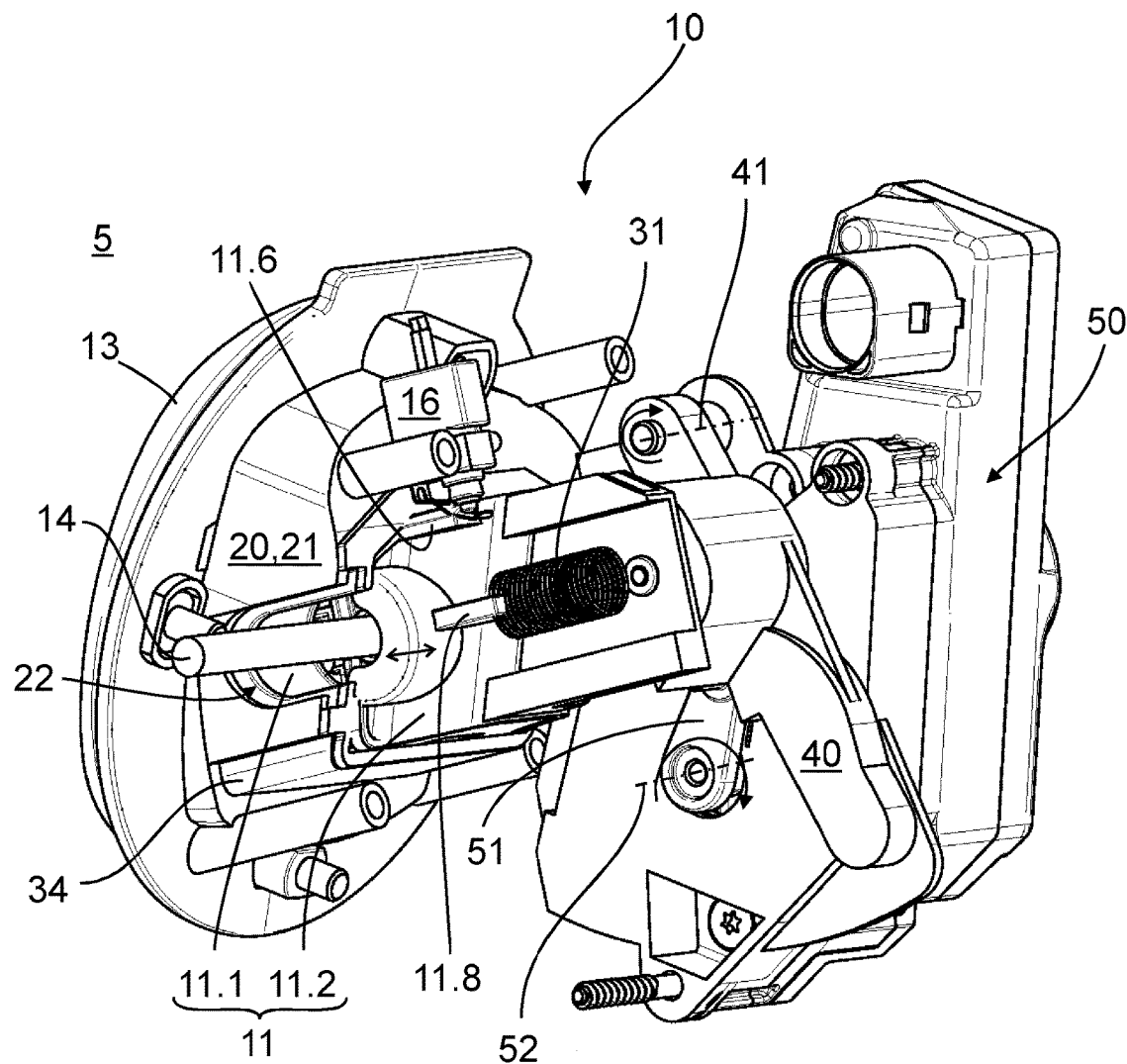

| | | | | |
|---|---|---|---|---|
| 2004/0145457 A1* | 7/2004 | Schofield | ............... | B60C 23/00 340/425.5 |
| 2009/0309971 A1* | 12/2009 | Schuetz | ................. | B60R 11/04 348/148 |
| 2014/0022811 A1* | 1/2014 | Wheeler | ................ | E05B 85/00 362/555 |
| 2014/0037283 A1* | 2/2014 | Cury | ................... | G03B 17/561 396/428 |
| 2017/0374248 A1* | 12/2017 | Eromaki | ............. | H04N 5/2254 |

FOREIGN PATENT DOCUMENTS

| | | |
|---|---|---|
| EP | 2508393 A1 | 10/2012 |
| KR | 20120034496 A | 4/2012 |

* cited by examiner

CAMERA DEVICE

The invention relates to a camera device, particularly as a parking assistance for a motor vehicle, comprising a drive that is operatively connected to a camera via gear means, the camera being moveable between a retracted position and a deployed position, and a carriage that embraces the camera and can move along with the camera.

Document DE 10 2006 039 192 A1 discloses a camera which can visually record the outer area of the vehicle. Hereby, the camera device comprises a gear with which the camera can be moved in two positions meaning a retracted position and a deployed position.

It is the object of the present invention to create a camera device which comprises a greater functionality, wherein the basic functionality relating to the park assistance operators is ensured.

The object of the present invention is solved by all features of the independent claim 1. Preferable embodiments of the invention are disclosed in the dependent claims.

The invention comprises the technical teaching that the gear means are configured in such a way that by a manual actuation from the outside the camera can be moved in an additional position that goes beyond the retracted position. The camera device according to the invention provides the additional function that via the manual actuating of the camera from the outside a further possibility is created for the user to influence further functions at the vehicle. The user can manually move the camera from a retracted position into the additional position which means to further sticking into the vehicle, wherein for example a further signal can be triggered in order to, for example, trigger a further vehicle related additional function. This can, for example, be the trigger of a signal, which can, for example, be an unlocking and/or locking and/or opening and/or closing of a vehicle lock or a vehicle door or a vehicle hatchback door.

Preferably, the distance of the camera between the additional position and the deployed position can be greater than the distance of the camera between the retracted position and the deployed position. This means that the camera during the movement from the retracted position into the additional position is moved into the vehicle. The movement can occur linear, on a circular path or in a combination of both previous possibilities.

The invention can further comprise that the carriage is configured at least from two parts, particularly that the carriage is configured by a first and a second carriage part. The carriage acts preferably as a housing for the camera. An advantage of the configuration from two parts is that the assembly of the camera is facilitated within the carriage. Further, the carriage can comprise additional functions at its outer housing wall which can for example comprise guidance means in order to be able to achieve a reliable movement of the camera between the retracted, deployed and additional position. Besides, the invention can comprise that the carriage comprises guidance means for a lid which serves as a protection element for the camera, particularly for the carriage, when the camera is in the retracted position or additional position.

Further, the camera device according to the invention can comprise that a signal can be triggered via a movement of the camera from the retracted position in the direction of the additional position, particularly can trigger a vehicle specific function. Therewith, it is possible that the camera serves as a switch.

Further, the invention provides the possibility that the carriage comprises an opening through which an electric wire proceeds to the camera, particularly, that the extension of the wire within the opening is orientated mainly perpendicular to the movement direction of the carriage. This means that the lead of the electric wire proceeds mainly transversely to the movement direction of the carriage, wherein by movement direction the direction within the scope of the invention has to be understood and along which the camera is moveable between the possible positions. The advantage of this embodiment of the invention is that a very compact embodiment of the camera device can be created since the electric wire occurs laterally. Normally, the electric supply line is assembled at the carriage side or camera side which extends into the vehicle. According to the invention therewith the installation space can be significantly reduced.

According to the invention the camera device comprises a housing within which the carriage is moveably mounted. The housing can comprise at least one guidance element at which the carriage is guided during the movement between said positions. The housing which embraces the carriage can for example comprise sealing means which effectively protect the camera from outer environmental influences like dust, moisture, dirt etc.

According to the invention, the housing which embraces the carriage can be permanently assembled in the vehicle, which means that within the housing the carriage is moveable with the camera. Further, the housing can comprise a recess through which the wire proceeds which is connected to the camera. The recess for the wire is preferably configured in a way that the relative movement of the wire is possible within the recess of the housing. The recess can for example be a longitudinal hole within which the wire moves during the movement of the camera. Further, the invention can be configured in a way that the housing is configured at least from two parts, wherein particularly a frontal housing part and a rear housing part configure the housing, wherein the frontal housing part is facing the deployed position and the rear housing part is facing the additional position. The two part configuration of the housing can serve as an assembling aid in order to reliably attach the camera device according to the invention and further to position the carriage with the camera exactly at the vehicle in an easy to assemble manner.

Preferably, the housing can comprise an acceptance in which at least one gear means is moveably accepted. Hereby, a compact unit of the camera device according to the invention is created, wherein the housing configures the medium to assemble gear means in a space saving and effective manner regarding the kinematics. Preferably, the camera device can be further improved in a way that an actuator as a gear means is in an operative connection with the drive, wherein the actuator is connected with a carriage, particularly with a second carriage part. Preferably, the drive is an electric motor which serves for the movement of the camera between said positions. Preferably, the drive can comprise a drive element which acts on the actuator, wherein particularly the drive element is moveably mounted about an axis and engages in a guide rail of the actuator. Via the movement of the drive element within the guide rail at the same time a movement of the actuator occurs. Since preferably the actuator is permanently connected to the carriage the camera can be moved between said positions. In a particular embodiment of the invention the actuator can be moveably mounted about an axis, wherein particularly the actuator is in the acceptance of the housing. Additionally, it is possible that the drive element comprises a cam which moves between a retracted position and a deployed position during a movement of the camera, within the guide rail. Alternatively, it is possible that the drive element comprises a guide rail and the actuator comprises a cam. Both alternative embodiments are characterized by a great durability, are particularly wear out unsusceptible and facilitate a compact construction of the camera device according to the invention.

Preferably, the guide rail can comprise a first area within which the moving drive element moves during a movement of the camera between the retracted position and the deployed position and a second area within which the stationary drive element moves during the movement of the camera between the retracted position and the additional position. The gear means therewith comprises a possibility that the camera with the carriage can be moved from the retracted position into the additional position, wherein the user performs a manual pressure to the camera device from the outside. The guide rail with a second area provides that the slide can be moved in direction of the additional position, wherein the drive element is not moving, particularly the drive is turned off. The guide rail is configured in a way that a collision between the gear means cannot result, since particularly the second area of the guide rail provides enough space for the drive element which moves during the movement of the carriage in the direction of the additional position relative within the guide rail.

In a measure improving the invention a spring element can act at the carriage which spring force is oriented oppositely to the movement in the direction of the additional position. For example, it is possible within the scope of the invention that the spring element is arranged within a chamber of the housing, wherein particularly the carriage comprises a protrusion which contacts the spring element. The chamber of the housing can be configured as a type of cavity in which the spring element is securely received. Preferably, the chamber can comprise an opening through which the protrusion extends by the movement of the camera in the direction of the additional position. Via the spring element it is ensured that the camera with the carriage can be securely and reliably displaced from the additional position in the retracted position.

Therewith, an attachment between the actuator and the carriage is achieved, wherein at the same time a freedom of movement of the fastening elements within the equalizing contour of the actuator is created, since it is necessary according to the invention to perform a movement of the actuator on the carriage.

According to the invention a switch can be assembled at the housing which at least partially protrudes into the travel of the carriage, wherein the carriage comprises a trigger element which triggers the switch during the movement of the camera in the direction of the additional position. Via the switch a vehicle specific function can be triggered, wherein the functionality of the camera device can be securely increased.

Further, the camera device according to the invention comprises a moveable lid which covers the camera in the retracted position, and in the deployed position the lid is in an open position with which the camera comprises a clear view to the outside. Further, the invention can be improved that the lid comprises at least one pressure element at the inner side which acts to the camera from the outside, particularly to the carriage, during a manual actuation. The lid can be assembled pivotably about an axis at the housing. The user can actuate the lid in closing position, particularly perform a manual pressure, wherein via the pressure element of the lid a force transmission occurs to the carriage, whereby a transfer of the carriage with the camera from the retracted position in the additional position can occur.

Preferably, the carriage comprises an encasement for the camera, wherein in the encasement at least one opening for a lens of the camera is arranged. Alternatively and/or additionally, sealing elements are arranged between the camera and the carriage, wherein the camera is protected from environmental influences.

According to the invention it can be intended that a crash lock is intended which acts on the carriage in a possible accident, whereby it is avoided that the carriage moves from the retracted position into the additional position. During an accident acceleration forces can act on the camera device, wherein without a crash lock an undesired movement of the carriage in the additional position is possible. The crash lock according to the invention, which is arranged in the inner side within the camera device, avoids this effectively. For example, it is possible that the crash lock can be moved about an axis of rotation and can at least take over two positions, a resting position and an active position, wherein in the resting position the carriage can be moved in its respective positions. In the active position the crash lock effectively avoids that the carriage achieves the additional position, wherein it is effectively avoided that the switch element is activated. The crash lock can be configured with multiple weights which are deflected during an accident due to the inertia force such that the crash lock can be moved and/or pivoted between the resting position and active position.

Figure 2:
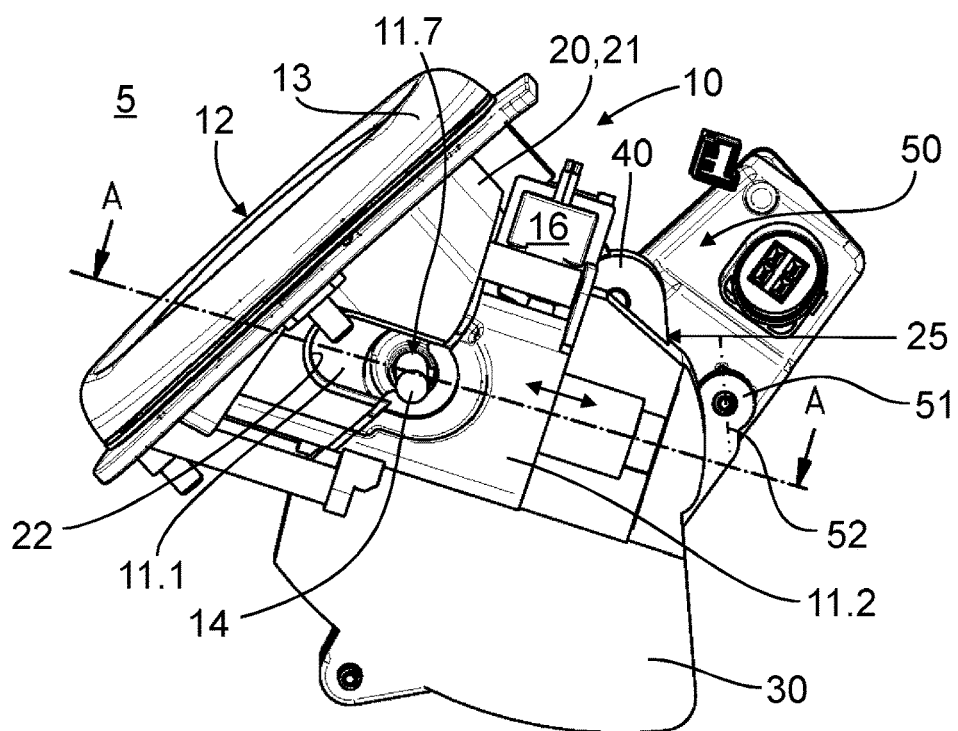
Figure 3:
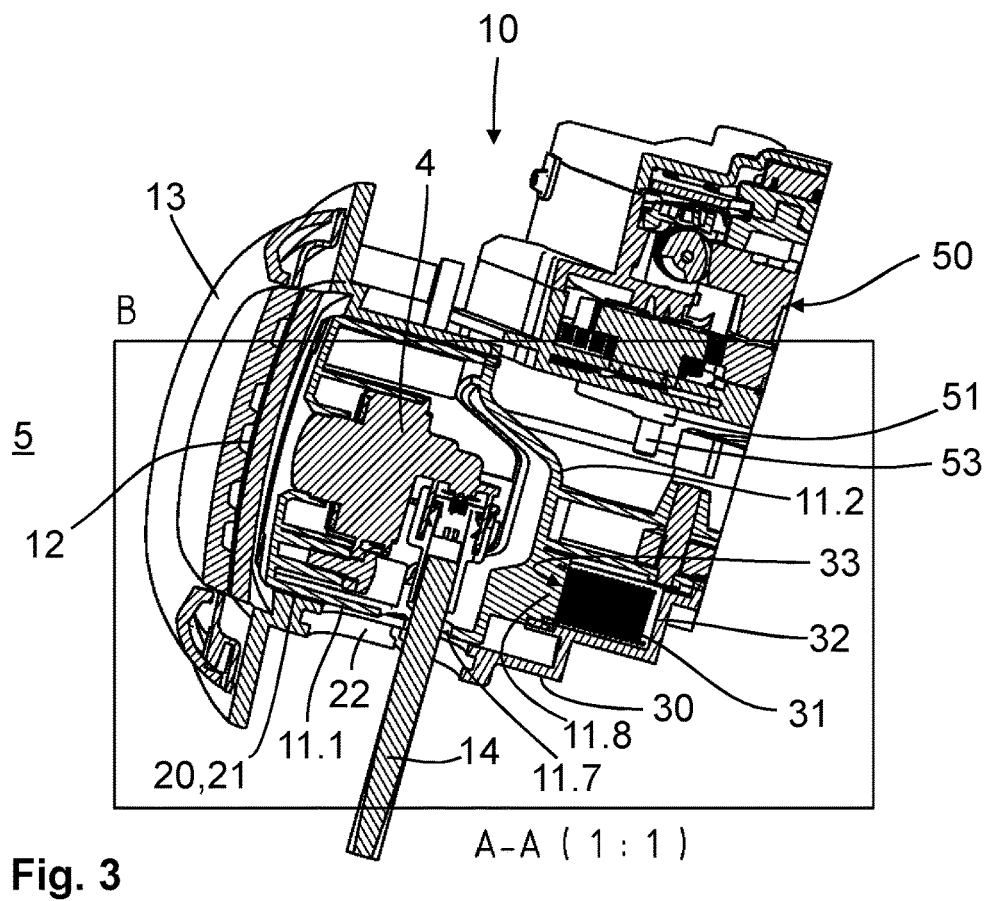
Figure 4:
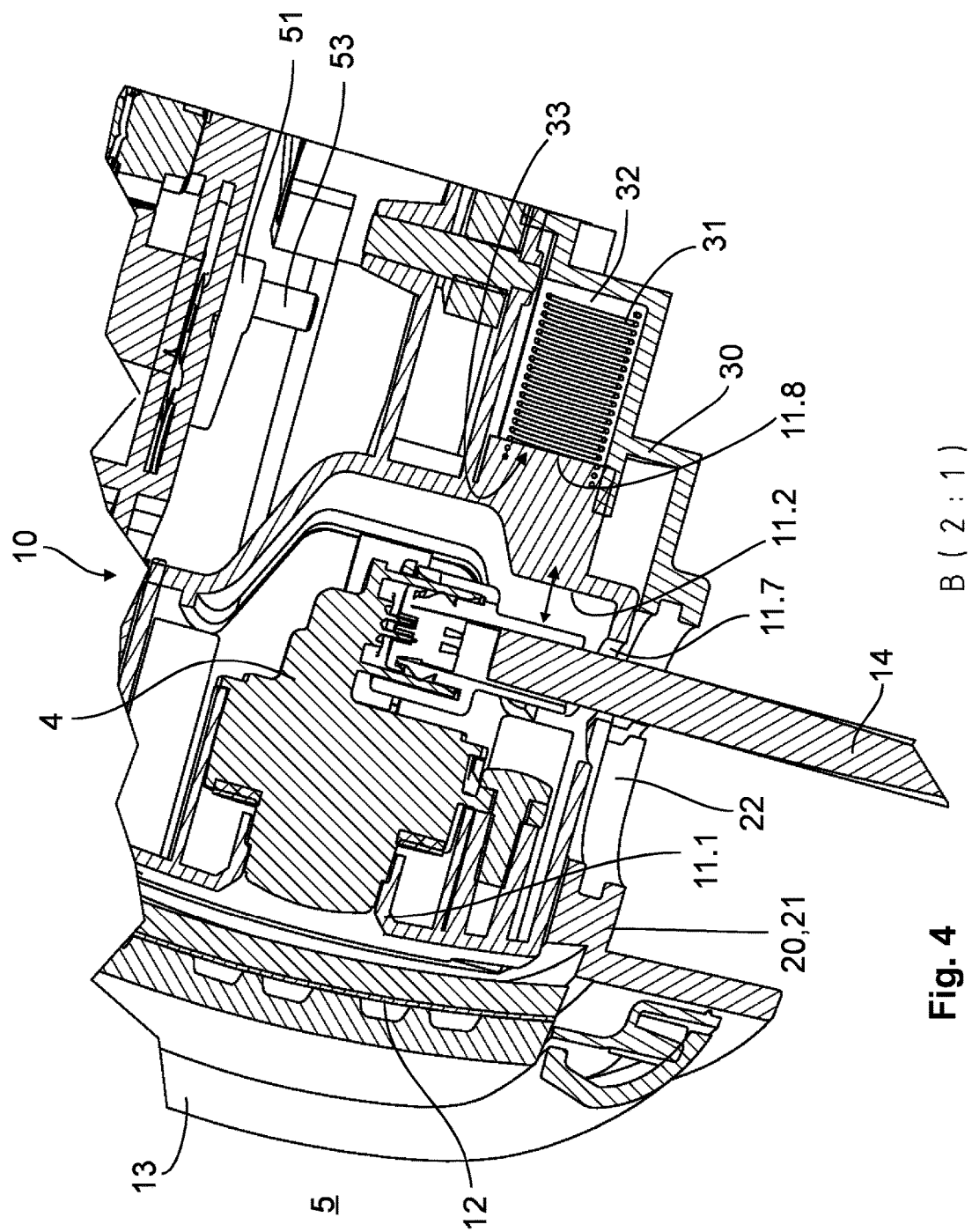
Figure 5:
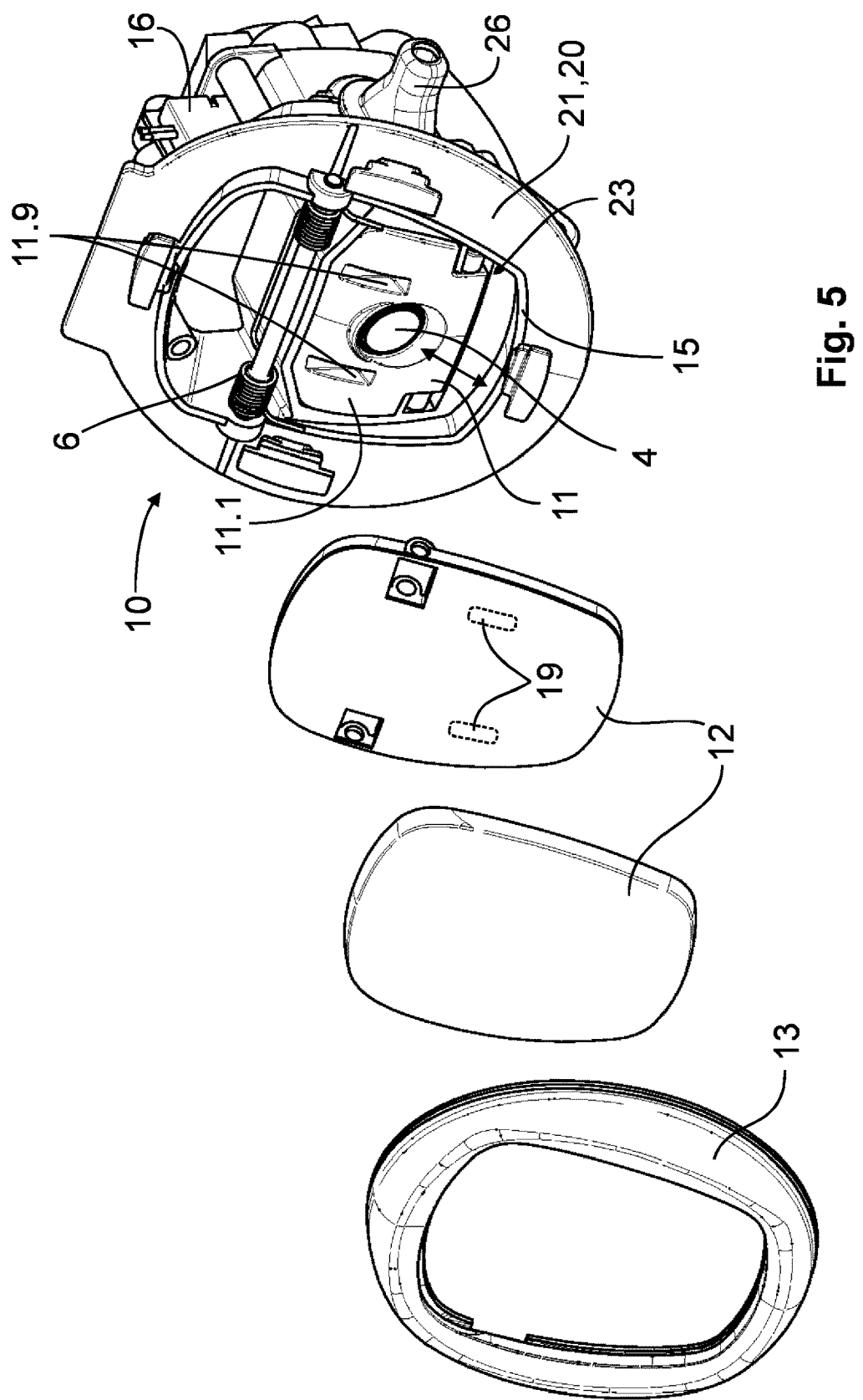
Figure 6:
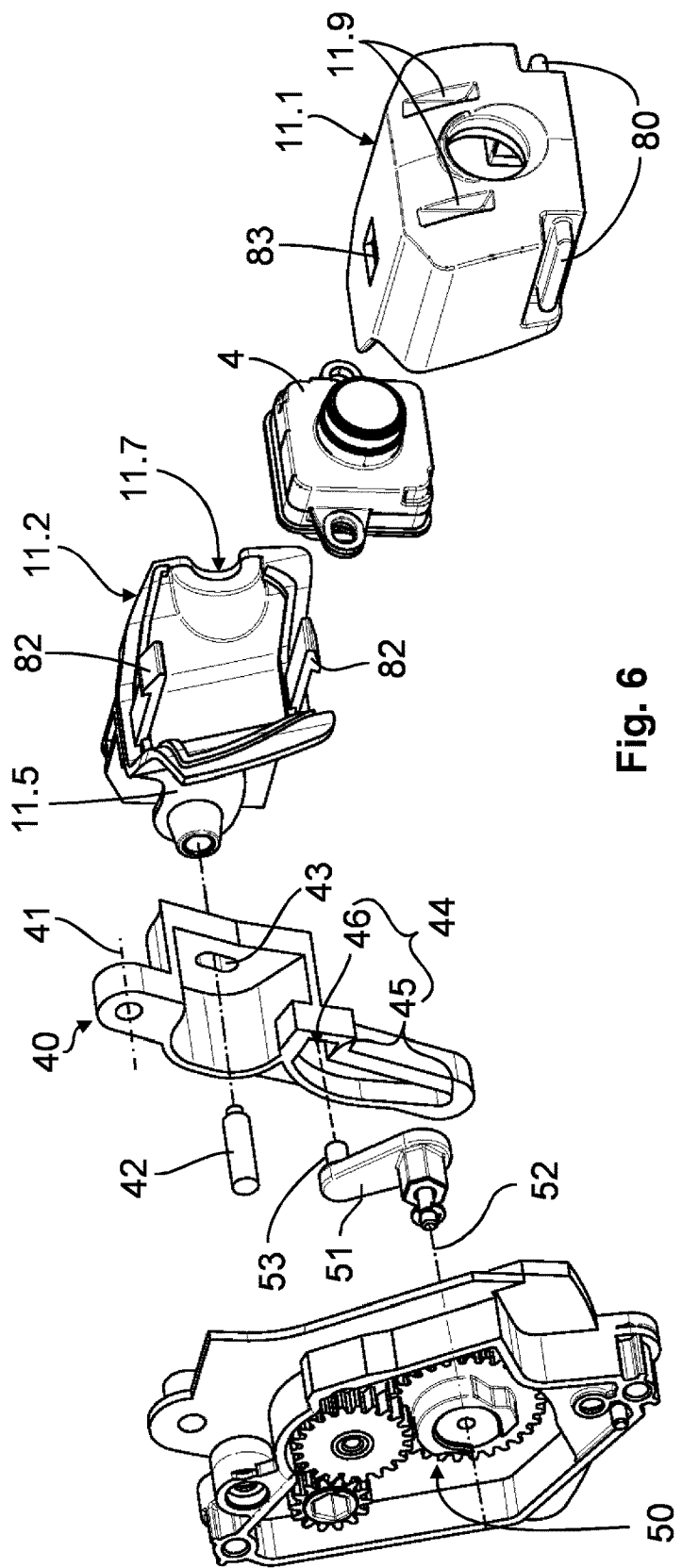
Figure 7:
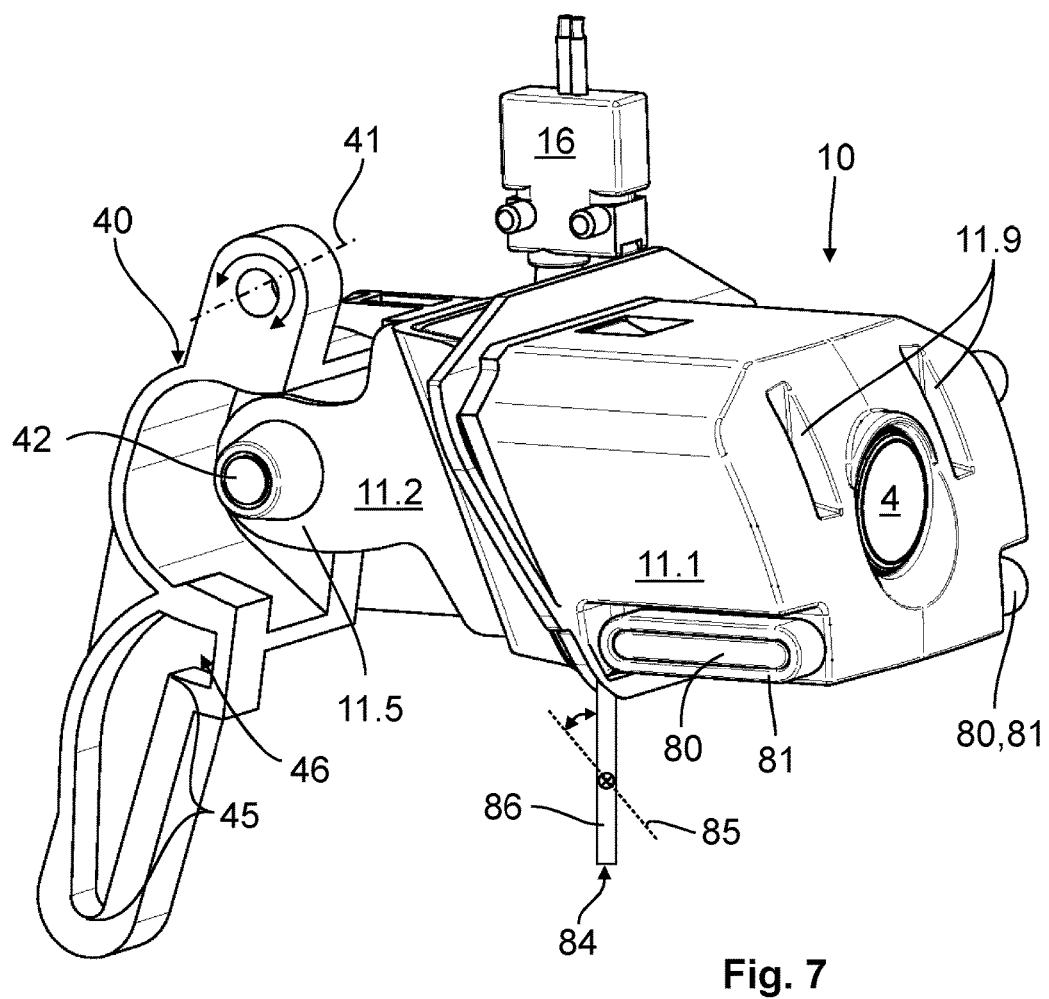
Figure 8:
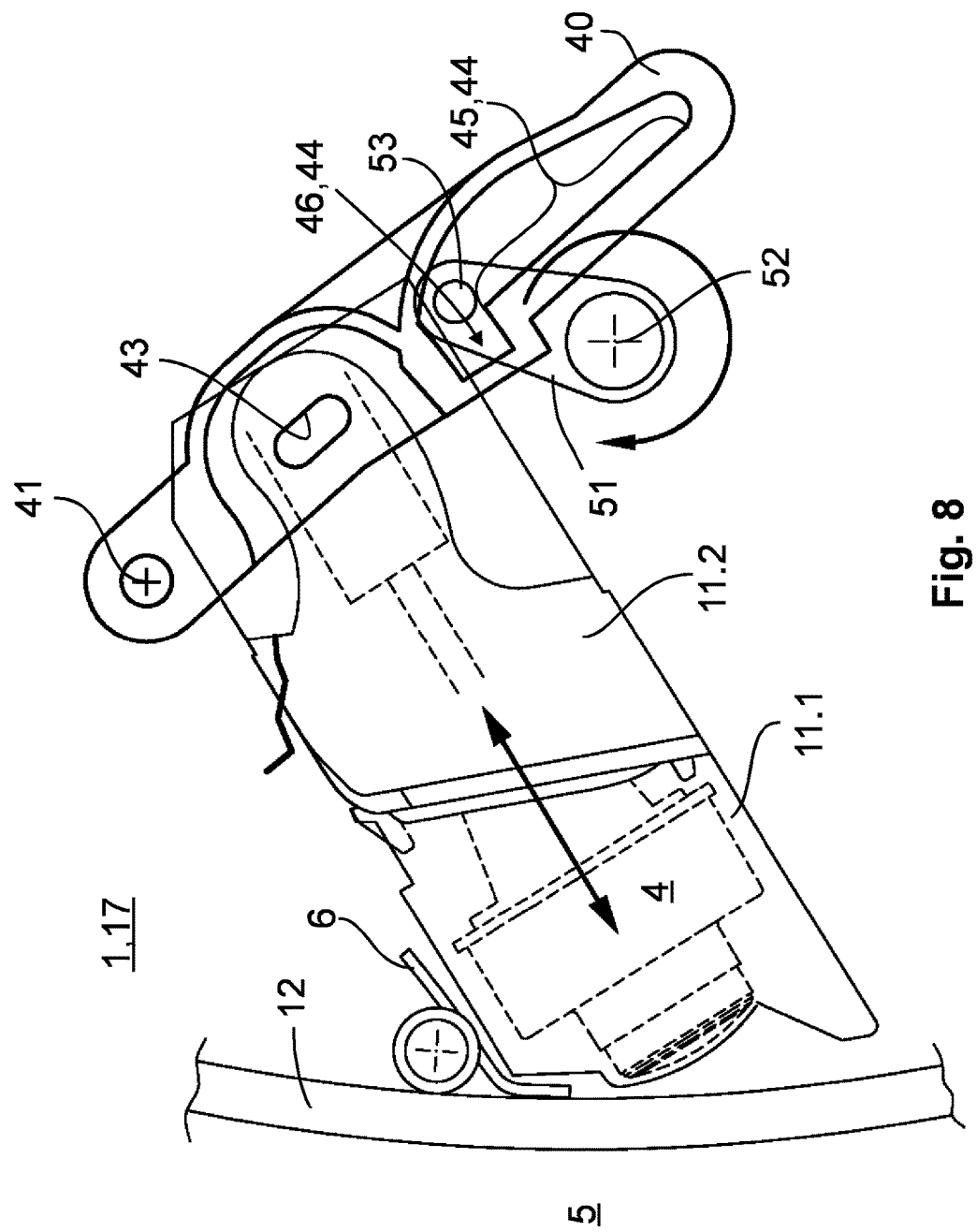
Figure 9:
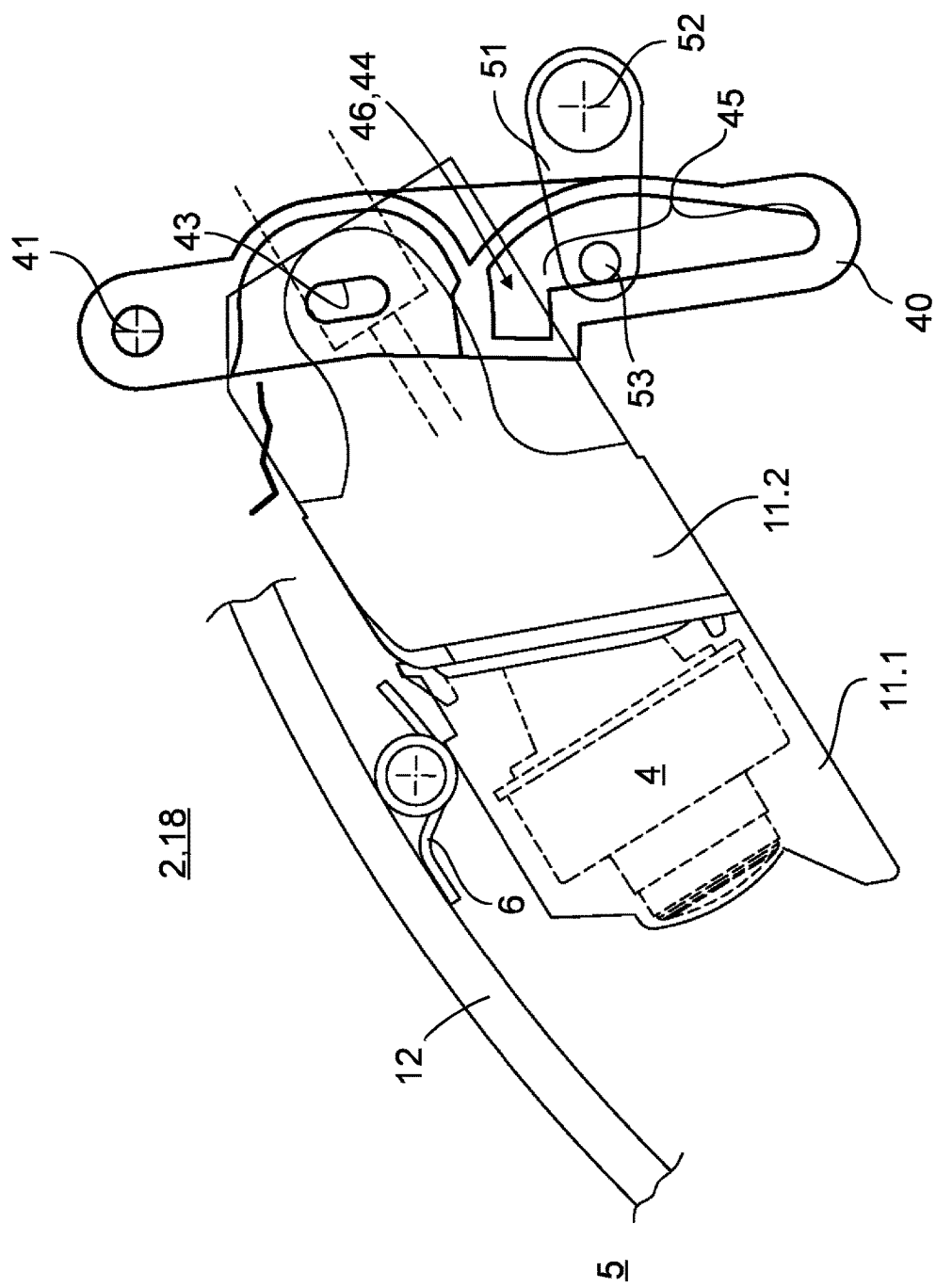
Figure 10:
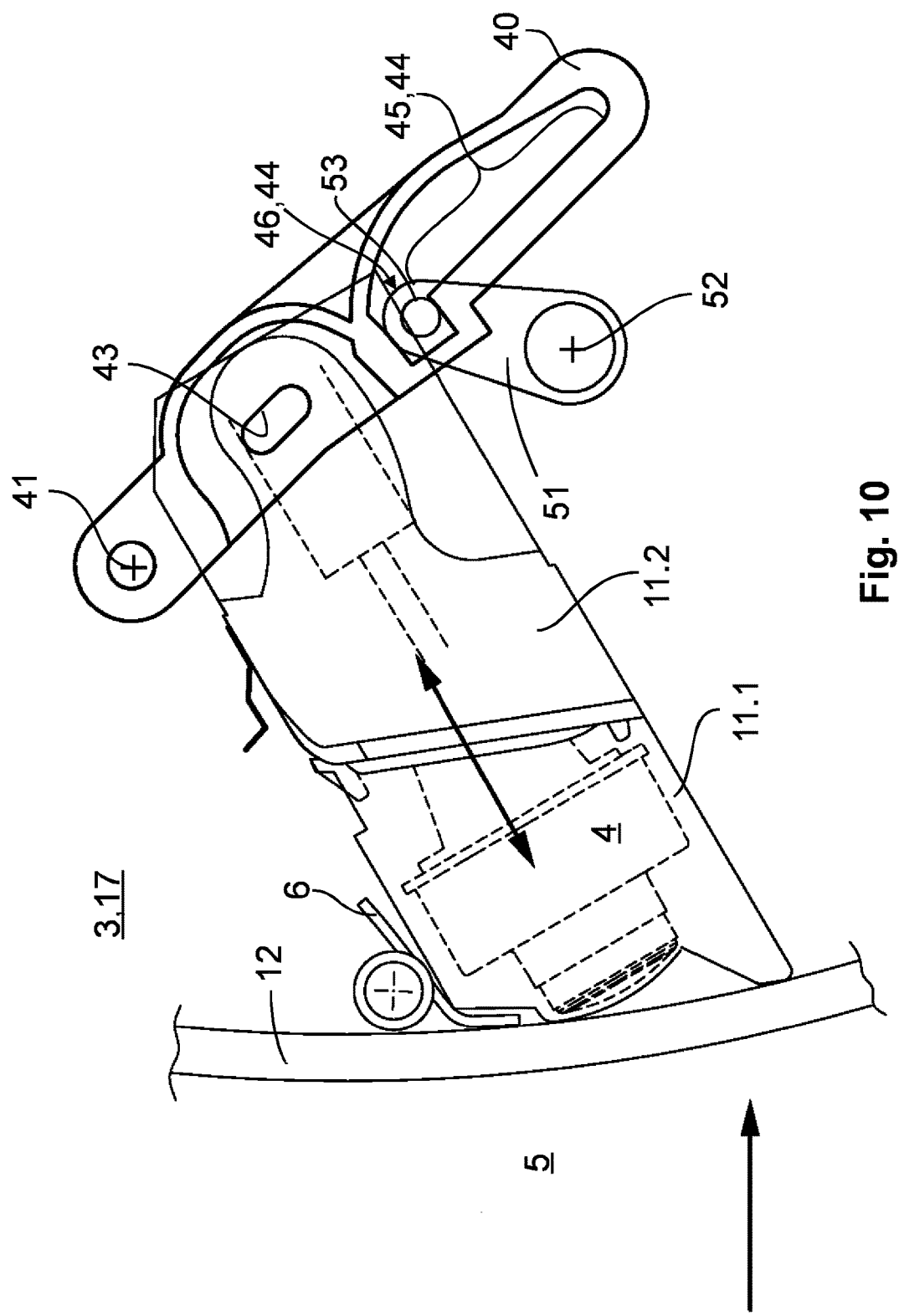

Further advantages, features and details of the invention result from the subsequent description in which embodiments of the invention are described in detail with relation to the drawings. Thereby, the features described in the claims and in the description can be essential for the invention each single for themselves or in any combination. It is shown:

FIG. 1 a possible embodiment of a camera device according to the invention,

FIG. 2 a camera device according to FIG. 1 in a further perspective,

FIG. 3 the camera device according to FIG. 1 in a further sectional representation, FIG. 4 the sectional representation according to FIG. 3 in an enlarged representation, FIG. 5 an explosion representation of the camera device according to FIG. 1, FIG. 6 a further explosion representation of the camera device according to FIG. 1, FIG. 7 a further embodiment of the camera device according to FIG. 1 with a crash lock, FIG. 8 a camera device in a retracted position, FIG. 9 the camera device in an deployed position and FIG. 10 the camera device in an additional position.

In FIGS. 1 to 10 a possible embodiment of a camera device 10 according to the invention is shown, which serves as a parking assistance apparatus for a vehicle. The camera device 10 comprises a drive 50 which is connected to a camera 4 via gear means. The camera 4 can be moved between a retracted position 1, a deployed position 2 and an additional position 3. In the retracted position 1 the camera 4 is in its resting position without performing a recording of the outer area 5. During the parking process the camera 4 is moved in its deployed position 2 in order to provide image information for the user which is related to the outer area 5 of the motor vehicle.

The camera 4 is assembled within a carriage 11 which acts as an inner camera housing. While the camera 4 is moving in the respective position 1, 2, 3 at the same time a movement of the carriage occurs, wherein according to the embodiment the carriage 11 is permanently connected to the camera 4.

In the present embodiment the carriage 11 is configured from two parts, wherein a first part 11.1 and a second part 11.2 configure the camera carriage 11. Laterally an opening 11.7 in the carriage 11 is arranged within the carriage 11 through which an electric wire 14 (camera wire) proceeds which is electronically connected to the camera 4 within the camera carriage 11. An advantage of a two part configuration of the camera carriage 11 is that the camera 4 can be assembled more easily in the camera carriage 11.

Like shown in the figures the gear means are configured in a way that via a manual actuation from the outside 5 the camera 4 is moveable in a further additional position 3 going beyond the retracted position 1 which is shown in FIGS. 8 to 10. With the movement of the camera 4 from the retracted position 1 in the direction of the additional position 3 a signal can be triggered which can trigger a vehicle specific function. In the present embodiment the signal serves for the possibility to open the hatchback flap. According to FIG. 1 to FIG. 4 and FIG. 10 the user pushes onto the camera device 10, particularly onto a lid 12 of the camera device 10, which is according to FIGS. 1 to 4 in the closed position 17. In the deployed position 2 of the camera 4 the lid 12 is in the open position 18. A spring 6 acts on the lid 12 such that the lid 12 can be reliably displaced independently from the open position 18 into the closed position 12 when the camera 4 is moved in the direction of the retracted position 1.

The carriage 11 comprises a lateral opening 11.7 through which the electric wire 14 proceeds to the camera 4. The camera carriage 11 is further embraced by a housing 20 according to the invention which is configured from two parts in the present embodiment. Hereby, the housing 20 comprises a frontal housing part 21 and a rear housing part 30. The frontal housing part 21 is adjusted to the lid 12, wherein the rear housing part 30 is facing the drive 50. The frontal housing part 21 comprises an opening 23 which is adjusted to the lid 12. In the retracted position 1 or the additional position 3 the lid 12 covers the opening 23. In the deployed position 2 of the camera 4, however, the lid 12 is in its open position 18, wherein the opening 23 is visible from the outside 5 and the camera 4 proceeds at least partially through the opening 23. The housing 20 further comprises a lateral recess 22 through which the wire 14 proceeds. The recess 22 is covered by a cover 26 which further comprises a sealing function. The recess 22 is configured enlarged such that during a movement of the carriage 11 the wire 14 can be reliably moved in the recess 22. The recess 22 therewith provides enough room for movement for the wire 14. According to FIG. 1 and FIG. 7 the carriage 11 is moveably mounted within the housing 20, wherein the housing 20 comprises a guidance element 34 in which the carriage 11 is guided during the movement between the positions 1, 2, 3. The carriage 11, particularly the first part 11.1 of the carriage 11, comprises an acceptance 80 which is moveably mounted within the guidance element 34 of the housing 20. According to the shown embodiments a belt 81 comprises the acceptance 80, wherein the belt is preferably from POM. When the camera 4 is moved in the respective position 1, 2, 3 the belt 81 proceeds within the guidance element 34 of the housing 20. Like shown in FIG. 7 the first part 11.1 of the slide 11 comprises at both sides the previously described acceptance 80 which is embraced by a belt 81 respectively. It has been shown that during the movement of the carriage 11 no noise generation within the guidance element 34 of the housing 20 occurs. Further, such a bearing of the carriage 11 at the housing 20 is often very low-wear.

In FIG. 2 it can be recognized that the housing 20 comprises an acceptance 25 in which at least one gear means is moveably accepted for the movement of the carriage 11 in its respective position 1, 2, 3. The gear means is in operative connection with the drive 50, wherein the drive 50 can for example be an electric motor. The gear means can comprise an actuator 40 provided according to FIG. 2 which is in the acceptance 25 of the rear housing part 30.

According to the embodiment the drive 50 comprises a drive element 51 which is moveable about an axis 52. Further, the drive element 51 is configured with a cam 53 which engages at the actuator 40. The actuator 40 comprises a guide rail 44 which is moveably mounted about the axis 41. The cam 53 proceeds within the guide rail 44 when the camera 4 moves in its respective position 1, 2, 3.

In FIG. 8 the retracted position 1 of the camera 4 is shown. The cam 53 is in a first area 45 of the guide 44. If a movement of the drive element 51 occurs clockwise via the drive 50, the cam 53 proceeds within the guide rail 44, particularly within the first area 45, to the position according to FIG. 9. While the drive element 51 has turned clockwise about the axis 52 a pivoting of the actuator 40 occurs clockwise about the axis 41. Spaced apart to the axis 41 the actuator 40 is connected with the carriage 11 by a fastening element 42. This is particularly shown in FIGS. 6 and 7. Here, it is shown that the fastening element 42 is moveable within the equalizing contour 43 of the actuator 40. The equalizing contour 43 is a longitudinal hole in the present embodiment. The fastening element 42 can for example be a rivet joint.

A backwards movement of the camera 4 from the deployed position 2 in the retracted position 1 can occur by turning the drive element 51 counter-clockwise from FIG. 9 via the drive 50 until the position of the drive element 51 is reached, which it possesses in FIG. 8. If a manual actuation by the user occurs from the outside to the carriage 11, the carriage 11 is moved from the retracted position 1 into the additional position 3 which is shown in FIG. 10. Hereby, the guide rail 44 is configured in a way that the carriage 11 can be moved into the inside of the motor vehicle along with the assembled actuator 40 without provoking an undesired collision with the permanent gear means like, for example, the drive element 51. Due to this reason the guide rail 44 comprises a second area 46 which is a further recess within the actuator 40, wherein the recess extends in the direction of the lid 12. In contrast to the second area 46 the first area 45 of the guide rail 44 is longitudinally extended, meaning in an opposite direction to the axis 41 of the actuator 40. One side of the first area 45 is further partly configured as a segment of a circle such that during a turning of the drive element 51 starting clockwise from FIG. 8 initially the actuator 40 remains in its position. Hereby, a free wheeling is generated which can be advantageous, particularly with the selection of simple cost efficient electro motors. Only starting with a certain rotational position of the drive 50 or the drive element 51, the cam 53 picks up the actuator 40 in a clockwise manner, whereby a movement of the carriage 11 is achieved. Advantageously, the movement of the carriage 11 shown in the embodiment is a linear movement between the respective positions 1, 2, 3.

According to FIG. 3 and FIG. 4 it is shown that a spring 31 acts on the carriage 11 in order to move the carriage 11 from the additional position 3 back in the retracted position 1. The spring 31 is assembled in a chamber 32 of the housing 20, particularly the rear housing part 30, wherein the chamber 32 comprises an opening 33 in which a protrusion 11.8 can retract. In the retracted position 1 of the camera 4 the spring 31 preferably exerts no force to the protrusion 11.8. Only with the movement in direction of the additional position 3 an approach of the protrusion 11.8 occurs to the spring element 31. In case the user does not exert a force to the carriage 11, particularly to the lid 12, the spring force of the spring 31 which acts on the protrusion 11.8 effects that the carriage 11 with the camera 4 proceeds back to the retracted position 1.

Likewise it is possible that the additional position 3 can be maintained via latching means which is not explicitly shown. Like shown in FIGS. 1 and 2 the camera device 10 is provided with a switching element 16 which is arranged above the carriage 11. The switch 16 at least partially protrudes into the travel of the carriage 11. Further, the carriage 11 comprises a releasing element 11.6, which releases the switching element 16 during the movement of the camera 4 in the direction of the additional position 3. The switching element 16 is permanently fastened to the housing 20. In case the switching element 16 is activated, a release of a signal results, wherein a vehicle specific function can be triggered.

As shown in FIG. 5 the moveable lid 12 comprises pressure elements 19 on the inside which act on the camera 4 during a manual actuation from the outside 5. The pressure elements 19 engage in the acceptances 11.9, wherein during a movement of the camera 4 in the deployed position 2 the pressure elements 19 slide along in the acceptances 11.9 and comprise a corresponding guidance during the movement of the lid 12. The pressure elements 19 are assembled inside of the lid 12 and extend protrusion-like in the direction of the carriage 11.

According to FIG. 7, the carriage 11, particularly the second part 11.2, is configured with a support element 11.5 through which the fastening element 42 extends. In the area of the opening 23 a sealing 15 is assembled onto which the lid 12 abuts in the closing position 17, see FIG. 5. In the present embodiment the sealing 15 is a labyrinth seal which effects an effective sealing. A decorative ring 13 is circumferentially assembled to the lid 12, wherein the decorative ring extends protrusion-like from the vehicle towards the outside 5.

In FIG. 7 a crash lock 84 is shown which is moveable between a resting position 85 and an active position 86. Normally, the crash lock 84 is in the resting position 85, such that the carriage 11 can be moved in its selective positions 1, 2, 3. During an accident acceleration forces can affect the motor vehicle, particularly the camera device 10, such that unintentionally a displacement of the carriage 11 in the direction of the additional position 3 can occur. Hence, the switch 16 would be triggered unintendedly. In order to avoid this, the crash lock 84 rejects from its resting position 85 in the active position 86 and acts directly at the carriage 11 in a way that the crash lock 84 in its active position 86 prevents that the carriage 11 moves in the direction of the additional position 3. According to FIG. 7, the crash lock 84 is shown in its active position 86 as an example, wherein the configuration of the crash lock 84 is shown schematically. Naturally, it is possible that the crash lock 84 can act as a carriage 11 in another way. Normally, the crash lock 84 comprises a weight which due to its inertance is moved faster in the direction of the active position 86 than the carriage 11 would move.

REFERENCE LIST

1 Retracted position
2 Deployed position
3 Additional position
4 Camera
5 Outside
6 Spring element, spring
10 Camera device
11 Carriage, two parts
11.1 First part
11.2 Second part
11.5 Supporting element
11.6 Releasing element
11.7 Opening (for cables)
11.8 Protrusion
11.9 Acceptance
12 Lid
13 Decorative ring
14 Electric wire, camera cable
15 Sealing
16 Switching element, switch
17 Closing position
18 Open position
19 Pressure element
20 Housing, two parts
21 Frontal housing part
22 Recess
23 Opening (for cameras)
25 Acceptance
26 Cover, nozzle
30 Rear housing part
31 Spring
32 Chamber
33 Opening
34 Guidance element
40 Actuator
41 Axis
42 Fastening element
43 Equalizing contour
44 Guide rail
45 First area
46 Second area
50 Drive
51 Drive element
52 Axis
53 Cam
80 Acceptance
81 Belt, drive belt
84 Crash lock
85 Resting position
86 Active position

The invention claimed is:

1. A camera device with a drive which is in an operative connection via gear means with a camera which is moveable between a retracted position and a deployed position, and
a carriage which embraces the camera and is moveable together with the camera,
wherein
the gear means are configured in such a way that via a manual actuation the camera is moveable in a further additional position going beyond the retracted position, such that a signal is triggered to activate a vehicle specific function comprising unlocking and/or locking and/or opening and/or closing of a vehicle lock or a vehicle door or a vehicle hatchback door, and the distance of the camera between the additional position and the deployed position is greater than the distance of the camera between the retracted position and the deployed position.

2. The camera device according to claim 1, wherein the carriage is configured at least from two parts.

3. The camera device according to claim 1, wherein by a movement of the camera from the retracted position in the direction of the additional position the signal is triggerable.

4. The camera device according to claim 1, wherein the camera serves as a switch.

5. The camera device according to claim 1, wherein the carriage comprises an opening through which an electric wire proceeds to the camera.

6. The camera device according to claim 5, wherein the housing comprises a recess through which the wire proceeds, wherein the recess is configured in a way that a relative movement of the wire is enabled within the recess.

7. The camera device according to claim 5, wherein the extension of the wire within the opening is oriented mainly perpendicularly to the movement direction of the carriage.

8. The camera device according to claim 1, wherein a housing is provided within which the carriage is moveably mounted.

9. The camera device according to claim 8, wherein the housing is at least configured from two parts.

10. The camera device according to claim 9, wherein a frontal housing part and a rear housing part configure the housing, wherein the frontal housing part is facing the deployed position and the rear housing part is facing the additional position.

11. The camera device according to claim 8, wherein the housing comprises an acceptance in which at least one gear means is moveably accepted.

12. The camera device according to claim 11, wherein an actuator is in operative connection with the drive as a gear means, wherein the actuator is connected to the carriage.

13. The camera device according to claim 12, wherein the drive comprises a drive element which acts on the actuator.

14. The camera device according to claim 13, wherein the drive element comprises a cam which moves during a movement of the camera between the retracted position and the deployed position within a guide rail.

15. The camera device according to claim 14, wherein the guide rail comprises a first area within which the moving drive element moves between the retracted position and the deployed position during the movement of the camera and comprises a second area, within which the stationary drive element moves between the retracted position and the additional position during the movement of the camera.

16. The camera device according to claim 12, wherein the actuator is pivotably mounted about an axis.

17. The camera device according to claim 13, wherein the drive element is pivotably mounted about an axis and engages in a guide rail of the actuator.

18. The camera device according to claim 8, wherein a spring element acts at the carriage which spring force is oriented oppositely to the movement in the direction of the additional position.

19. The camera device according to claim 18, wherein the spring element is assembled within a chamber of the housing.

20. The camera device according to claim 19, wherein the chamber comprises an opening through which the protrusion extends during a movement of the camera in the direction of the additional position.

21. The camera device according to claim 18, wherein the carriage comprises a protrusion which contacts the spring element.

22. The camera device according to claim 8, wherein a switch is assembled at the housing which at least partially extends in the travel of the carriage, wherein the carriage comprises a releasing element which triggers the switch during the movement of the camera in the direction of the additional position.

23. The camera device according to claim 8, wherein the housing is stationary within which the carriage is moveable.

24. The camera device according to claim 8, wherein the housing comprises at least one guidance element at which the carriage is guided during the movement between the positions.

25. The camera device according to claim 1, wherein a moveable lid covers the camera in the retracted position and in the deployed position the lid is in an open position by which the camera comprises a free sight towards the outside.

26. The camera device according to claim 25, wherein the lid comprises at least one pressure element at the inside which acts on the camera during the manual actuation.

27. The camera device according to claim 1, wherein a crash lock is intended which acts on the carriage during a possible accident, whereby it is prevented that the carriage moves from the retracted position into the additional position.

28. The camera device according to claim 12, wherein the actuator is connected with the carriage via a fastening element.

29. The camera device according to claim 28, wherein the fastening element is moveable within the equalizing contour of the actuator.

30. The camera device according to claim 12, wherein
the carriage is configured by a first and a second carriage part.

31. The camera device according to claim 30, wherein
the actuator is connected with the second carriage part.

32. The camera device according to claim 12, wherein
the actuator is in the acceptance of the housing.

\* \* \* \* \*